United States Patent [19]

Warchol

[11] Patent Number: 5,519,832

[45] Date of Patent: May 21, 1996

[54] METHOD AND APPARATUS FOR DISPLAYING MODULE DIAGNOSTIC RESULTS

[75] Inventor: Nicholas A. Warchol, Boxborough, Mass.

[73] Assignee: Digital Equipment Corporation, Maynard, Mass.

[21] Appl. No.: 386,253

[22] Filed: Feb. 9, 1995

Related U.S. Application Data

[63] Continuation of Ser. No. 976,050, Nov. 13, 1992, abandoned.

[51] Int. Cl.⁶ .................................................. G06F 11/00
[52] U.S. Cl. ........................................................ 395/183.22
[58] Field of Search ................................ 371/16.5, 16.1, 371/29.1; 395/575, 183.01, 183.22, 185.01

[56] References Cited

U.S. PATENT DOCUMENTS

| | | | |
|---|---|---|---|
| 3,988,603 | 10/1976 | Griffin | 235/153 |
| 4,041,455 | 8/1977 | Norberg | 340/146.1 C |
| 4,168,527 | 9/1979 | Winkler | 364/580 |
| 4,200,224 | 4/1980 | Flint | 371/18 |
| 4,403,213 | 9/1983 | Khamare | 340/517 |
| 4,433,413 | 2/1984 | Fasang | 371/25 |
| 4,475,196 | 10/1984 | La Zor | 371/29.1 |
| 4,683,568 | 7/1987 | Urban | 371/12 |
| 4,890,102 | 12/1989 | Oliver | 340/825.17 |
| 4,959,772 | 9/1990 | Smith | 364/200 |
| 4,974,080 | 11/1990 | Fritchie | 358/139 |
| 5,018,143 | 5/1991 | Platteter | 371/16.4 |
| 5,081,627 | 1/1992 | Yu | 371/29.1 |
| 5,114,364 | 5/1992 | Hunter | 439/497 |
| 5,282,752 | 2/1994 | Doutrich | 439/79 |
| 5,327,435 | 7/1994 | Warchol | 371/16.1 |

*Primary Examiner*—Robert W. Beausoliel, Jr.
*Assistant Examiner*—Ly V. Hua
*Attorney, Agent, or Firm*—Arthur W. Fisher; Ronald C. Hudgens; Cathy Peterson

[57] ABSTRACT

A reliable diagnostic system for running power-up diagnostics, displaying power-up diagnostic results, and retaining a power system status history. First, a method of testing a processor module in a computer system is provided. A processor including a serial port reads processor module diagnostic test instructions from a PROM in a serial line controller through the serial port by way of a serial bus in response to power-up reset instructions. Next, a reliable connection of a serial control bus to the modules is provided. Accordingly, backplane connectors are provided including wide signal conducting elements having multiple solder connection points to the modules and backplane. The serial control bus is electrically connected to each module through the multiple connection points of these signal conducting elements. Also, an apparatus and method for indicating module failures in a computer system is provided. A console panel is provided in the computer system comprising LED's visible to the user, each LED corresponding to a particular module. Any LED which remains lit indicates the failure of the corresponding module. Finally, a method and apparatus is provided for maintaining a power system status history. Status indicators corresponding to various environmental conditions in the system are supplied. When any status indicator changes value, the status indicators are stored in a non-volatile memory. In the event of a system shutdown, the nonvolatile memory then retains a status history representing the environmental changes prior to shutdown.

3 Claims, 7 Drawing Sheets

METHOD AND APPARATUS FOR DISPLAYING MODULE DIAGNOSTIC RESULTS

This application is a continuation of application Ser. No. 07/976,050 filed Nov. 13, 1992, now abandoned.

FIELD OF THE INVENTION

The invention pertains to power up diagnostics and status reporting in multi-module computer systems, and particularly to a reliable diagnostic system for running power-up diagnostics, displaying diagnostic results, and providing power system status.

BACKGROUND OF THE INVENTION

Today's computer systems typically employ multiple electronic modules which cooperate to perform system functions and which pass information to one another through means such as a backplane system bus. A typical system may contain one or more CPU modules including the system processors, an I/O module for communicating with external devices, multiple memory modules, and a power subsystem controller module for monitoring and controlling system power. Power-up diagnostics are provided in such systems for testing each module and identifying any failures.

Power-up diagnostics typically begin by testing the processor on the CPU module, and then testing its ability to access the system bus. However, the diagnostic test instructions to be executed by the processor for testing the processor and CPU module typically reside in a non-volatile memory such as a ROM which is located somewhere on the system bus. Thus, the ability to test the processor and bus access capability depends upon the operability of the system bus, which is subject to an increased risk of failure due to its multitude of bus lines and its interconnection throughout the system. There is a need for providing processor module test instructions to the processor by way of some means other than the system bus, so that testing of the processor and CPU module may proceed independently of the condition of the system bus.

There must then be a way for the processor to determine which modules are installed, and to store any fault information for each module. Serial control busses separate from the system bus have been implemented in multi-module computer systems for determining the presence modules and storing fault information. A typical such serial control bus consists of an RS-232 or Inter-Integrated Circuit (I²C) two line serial bus connected to each module. Serial non-volatile memories are connected to the serial control bus on each module, so that in the event of a module failure, the fault tags indicating the cause of the failure may be stored for retrieval at the service depot by means of the serial bus.

It is preferred that the serial control bus be highly reliable, as its functionality is required on power-up in order to determine module configuration in case the system bus is inoperable, and because it is the means for storing fault information in case there is a failure. However, the serial control bus is typically connected to the modules through the backplane bus connectors. As computer systems become increasingly more complex, the complexity of these backplane bus connectors increases accordingly. Today's backplane busses may be hundreds of bits in width, therefore they tend to require backplane connectors with very small, thin, tightly packed pins. These pins are subject to an increased risk of mechanical connection failures due to breakage and/or shorting to adjacent pins. A more reliable means of connecting the serial control bus lines to the modules is therefore desired.

Next, there must be some way of relating to the user during power-up diagnostic execution which modules are being tested and which have failed. In the past, each module in a computer system may have been provided with a LED which remains lit when the module is operating correctly. However, for ergonomic and regulatory reasons it may be preferable to light LEDs only when a module is inoperable; i.e. a lit LED indicates a bad module. In this case, if the LEDs reside on the modules themselves, it may not be possible to light the LED if the module is bad or mis-installed. There is therefore a need to separate the LED test indicators from the modules to be tested.

Finally, during normal operation, there are many conditions which may cause the entire computer system to power down. The computer power subsystem monitors these environmental conditions, and when it determines that the operating environment has become unsafe for continuing normal operation, it shuts down power to the system.

The conditions which may cause power shutdown include a deliberate power down by the operator, or an unexpected power failure. Intervening environmental events may also cause power shutdown. For instance, the ambient temperature may be too high, the cooling fans may fail, or the AC line voltage may be out of tolerance.

If the environment returns to its normal condition before field service personnel are able to check the system, the system is likely to power up normally. It may then be impossible to determine the reason for the system shutdown. Where the shutdown occurred due to an external power failure, the system should be presumed fully functional on power up, but where the shutdown was due to an overtemperature condition or a fan failure, an intermittent system problem may exist. If field service personnel mistakenly attribute a system shutdown to a power failure, there is a chance that a real system problem has been left to re-occur, leading to excessive service calls and customer dissatisfaction.

It is therefore desirable to provide a means for storing information representing environmental conditions present in the power subsystem prior to a power shutdown, which may be recalled after the system is powered back up to aid in determining the cause of the shutdown.

SUMMARY OF THE INVENTION

According to the principles of the invention, a reliable diagnostic system for running power-up diagnostics and retaining a power system status history is provided.

According to one aspect of the invention, a method of testing a processor module in a computer system is provided. A processor module is provided including a processor containing a serial port. A serial ROM is coupled to the serial port by a serial bus, and a serial line controller including a PROM is also coupled to the serial bus. Power-up test instructions are read from the serial ROM into the processor by way of the serial bus in response to a system hardware reset. According to the invention, the processor then reads processor module diagnostic test instructions from the PROM in the serial line controller by way of the serial bus in response to the power-up instructions.

The test instructions for power-up testing of the processor and the CPU module system bus interface are therefore provided by a serial bus which operates independently of the parallel system bus. Because the serial bus has few bus lines, and it is not interconnected throughout the system as the parallel system bus is, it provides a more reliable means for transferring power-up test instructions than the system bus.

In another aspect of the invention, a reliable means for connecting a serial control bus to the modules is provided. Accordingly, connectors are provided for electrically connecting each module to a backplane. The connectors include wide signal conducting elements having multiple solder connection points to the modules and backplane. The serial control bus is electrically connected to each module through the multiple connection points of these signal conducting elements, thus decreasing the chance that the serial control bus will fail due to bending or mechanical breakage of the pins, or shorting of adjacent pins.

According to a further aspect of the invention, an apparatus and method for indicating module failures in a computer system is provided. Broadly stated, this aspect of the invention operates in a computer system comprising one or more CPU modules, an I/O module, and one or more memory modules. A console panel is provided in the computer system comprising LED's visible to the user, each LED corresponding to a particular module. Any LED which remains lit indicates the failure of the corresponding module.

More particularly, power-up diagnostics are executed by an installed CPU. System testing proceeds by turning on the LEDs corresponding to the CPU modules and turning off the LEDs corresponding to all other modules in response to a hardware reset. Diagnostics then proceed by testing one CPU module, and testing a 2nd CPU module if it is installed; turning off the LED corresponding to the one CPU module if the testing of the one CPU module detects no failures; testing for the presence of the 2nd CPU module; turning off the LED corresponding to the 2nd CPU module if it is found to be not present; turning on the LED corresponding to the I/O module; testing for bus access to the I/O module from the 1st CPU module; turning off the LED corresponding to the I/O module if the testing for bus access detects no failures; turning on the LEDs corresponding to the installed memory modules; and, for each memory module that is installed, testing the memory module, and turning off the LED if the testing of the memory module detects no failures.

According to this method and apparatus, LEDs are provided on a console panel separate from the modules to be tested, providing the ability to positively indicate a module failure with a lit LED.

According to the final aspect of the invention, a method and apparatus is provided for maintaining a power system status history. In a broad sense, status indicators corresponding to various environmental conditions in the system are supplied. When any status indicator changes value, the status indicators are stored in a non-volatile memory. In the event of a system shutdown, the non-volatile memory then retains a status history representing the environmental changes prior to shutdown. Furthermore, this history may be retrieved from the non-volatile memory when the system is powered back up.

In a more specific sense, a power system control module, a CPU module, and an I/O module are three of the various modules installed in the computer system. Parallel status indicators are generated on the power system control module. When a status indicator changes, the indicators are converted to a serial bitstream suitable for serial transfer, transferred serially from the power system control module to the I/O module, converted back to parallel and read over the parallel system bus by the CPU module, and transferred over the parallel system bus from the CPU module to a non-volatile memory on the I/O module.

All of these aspects of the invention combine to provide a reliable diagnostic system for running power-up diagnostics, displaying diagnostic results, and retaining a power system status history.

DETAILED DESCRIPTION OF THE PREFERRED EMBODIMENT

Figure 1:
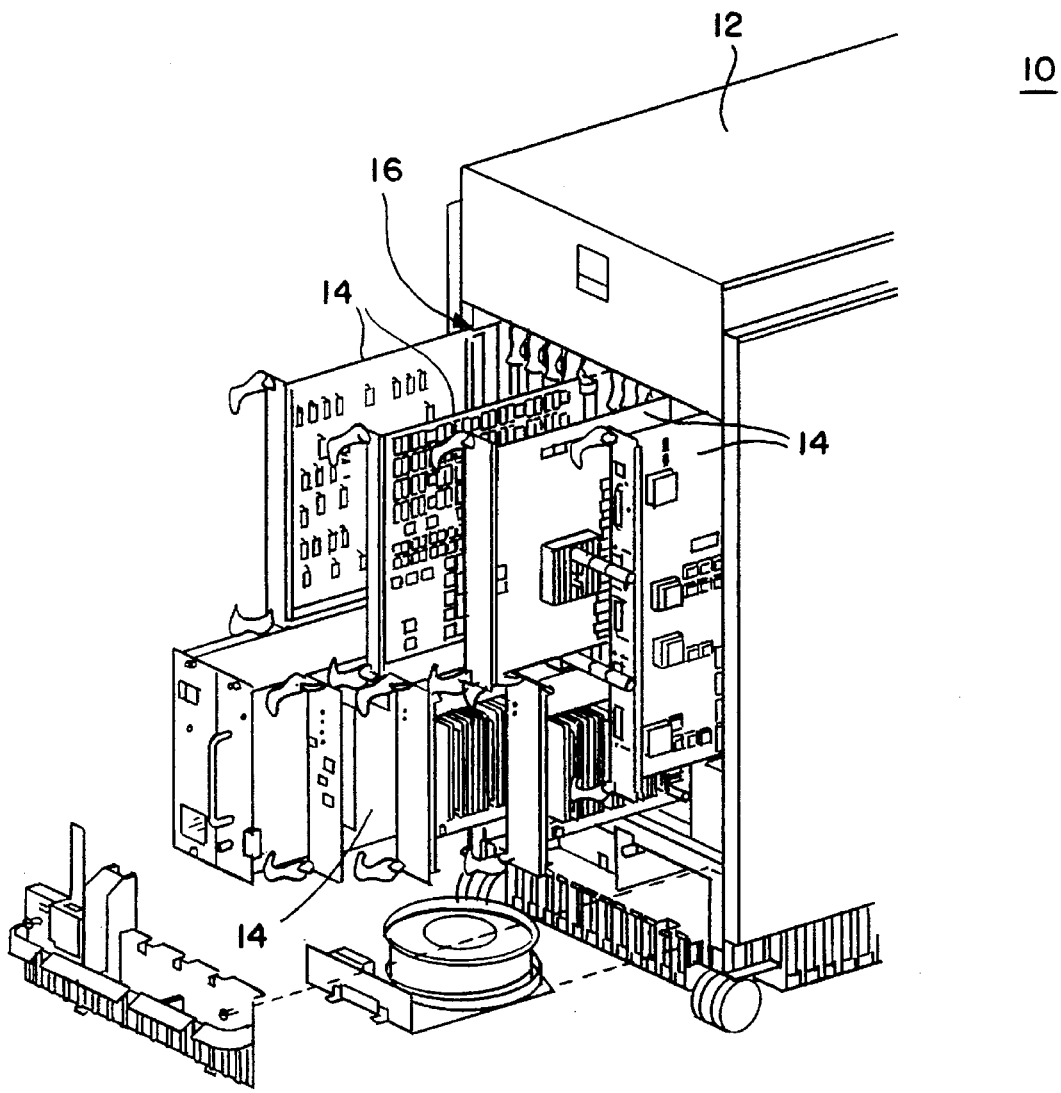
FIG. 1 is a representation of a multi-module computer system embodying the various aspects of the invention.

FIG. 1 is a representation of a multi-module computer system 10 embodying the various aspects of the invention. The computer chassis 12 houses a configuration of electronic circuit modules 14, 10 which may be for example CPU, memory, power system control module, console, and I/O modules. Various system configurations are possible, including multi-CPU module and multi-memory module configurations. The modules 14 are connected by backplane connectors 16 to a backplane 18 (not shown). On the front of the computer system 10 is an Operator Control Panel 20 (not shown) which provides LEDs 22 for indicating power-up diagnostic status of modules 14 to the user.

Figure 2:
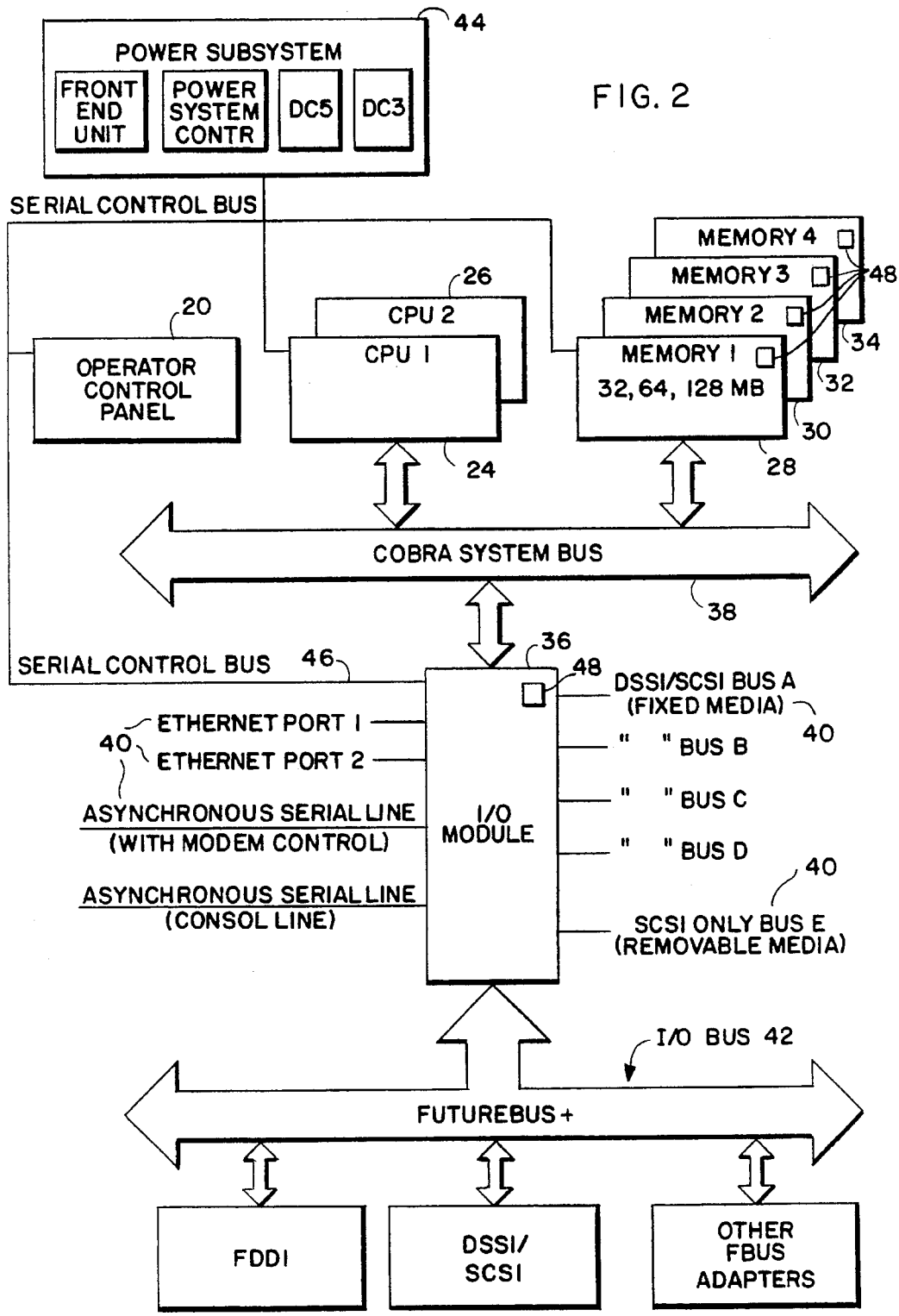
FIG. 2 is a functional block diagram of the fully configured computer system 10 of FIG. 1.

FIG. 2 is a functional block diagram of the fully configured computer system 10 of FIG. 1. The computer system 10 contains circuit modules 14 including primary CPU module 24 and secondary CPU module 26, memory modules 28, 30, 32, and 34, and an I/O module 36, all interconnected by parallel system bus 38. I/O module 36 supports various I/O devices 40, and an I/O bus 42, for example a Futurebus+ for supporting Futurebus+ compatible devices. Further included in computer system 10 are operator control panel 20 and power system control module 44. CPU modules 24 and 26, memory modules 28, 30, 32, and 34, I/O module 36, operator control panel 20, and power system control module 44 are all interconnected by serial control bus 46, used during power-up diagnostics for determining whether particular modules are installed and for lighting LEDs on the operator control panel 20, and during operation for storing fault information in non-volatile memories 48 located on the modules. The serial control bus 46 has conveniently been implemented according to the industry standard I²C (Philips) protocol, though other types of serial busses may be found appropriate.

Power-up diagnostics are executed automatically upon a power-up reset in a computer system like computer system 10. Power-up diagnostics begin by testing the functionality of the processors and system bus interface logic on the CPU modules 24 and 26, and then proceed to check for installation and functionality of the other modules in the system. The progression of the diagnostic testing and the failures encountered must be indicated to the user during the testing.

Since the power-up diagnostics are executed by system processors on the CPU modules 24 and 26, the first task of the power-up diagnostics is to check the functionality of the system processors and their ability to access the bus. Thus, according to one aspect of the invention, an apparatus and method for testing a processor module in a computer system is provided.

Figure 3:
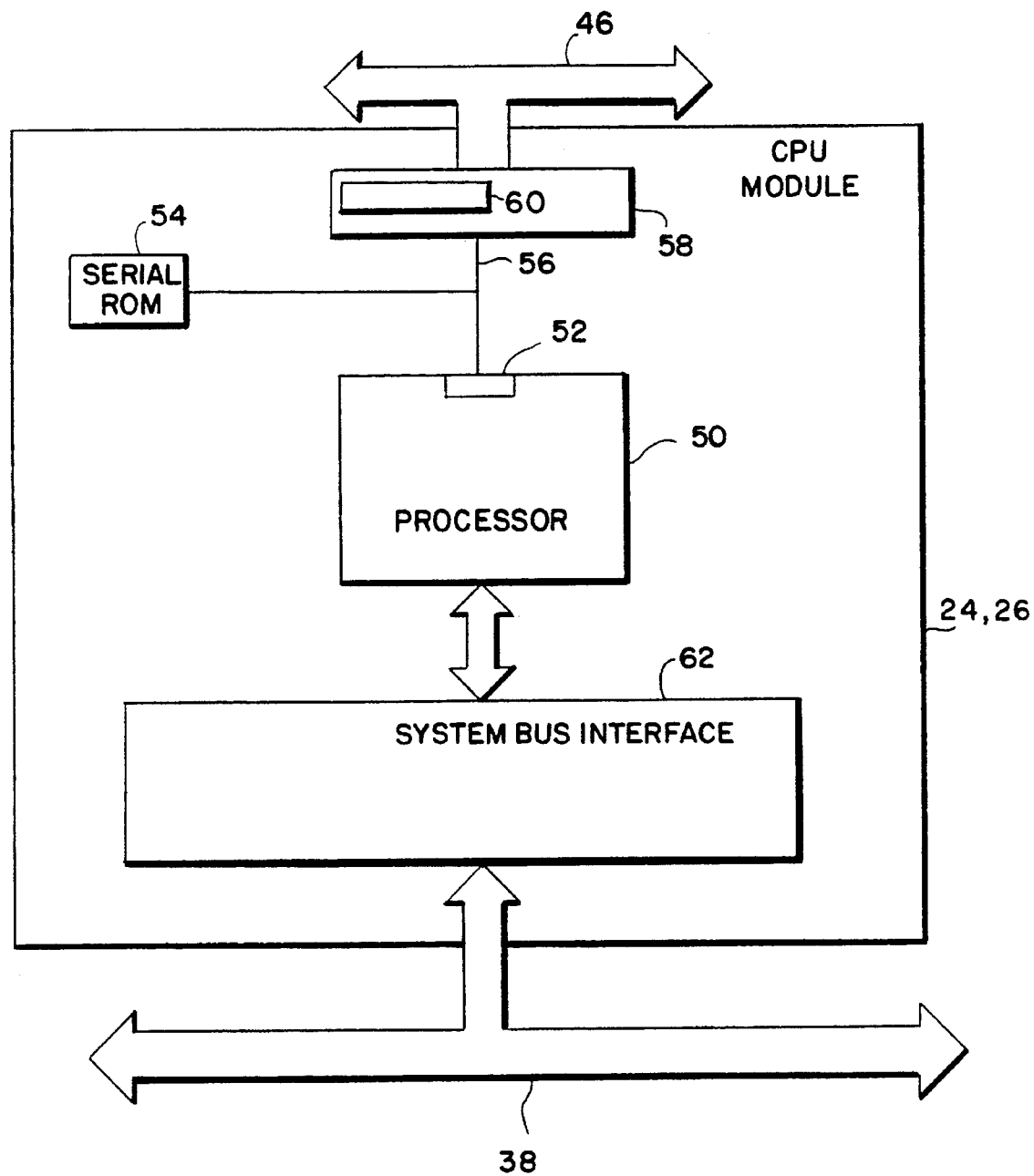
FIG. 3 is a detailed block diagram of the primary and secondary CPU modules 24 and 26 of FIG. 2.

FIG. 3 shows a detailed block diagram of the primary and secondary CPU modules 24 and 26 of FIG. 2. Each CPU module includes a processor 50 including a serial port 52. A serial ROM 54 is coupled to the serial port by way of a local serial bus 56. A serial line controller 58 including a PROM 60 is also coupled to the local serial bus 56, and interfaces the processor 50 to the serial control bus 46. The processor 50 is also coupled to system bus interface logic 62, which interfaces the processor 50 to the system bus 38.

Upon a hardware reset due to system power-up, the processor 50 automatically executes a read from a specific location known as the reset address into serial port 52 by way of serial bus 56. Accordingly, serial ROM 54 is mapped at the reset address, so the processor 50 reads its power-up instructions from serial ROM 54.

According to the invention, the power-up instructions read from serial ROM 54 instruct the processor 50 to read processor module diagnostic test instructions from the PROM 60 in the serial line controller 58 by way of local serial bus 56. Instructions read from PROM 60 exercise the processor 50 and the system bus interface 62. Thus, since power-up diagnostic test instructions are read from the local serial bus 56, system bus 38 need not be operational in order to test the processor 50 and surrounding logic on the CPU modules 24 and 26.

Continuing to refer to FIG. 3, the processor 50 is preferably implemented as an "ALPHA" 64 bit microprocessor made by Digital Equipment Corporation, which includes a serial port 52 and automatically reads power-up reset instructions through the serial port 52. It has been convenient to utilize an I$^2$C compatible 87C652 microcontroller including an 8K PROM to implement the serial line controller 50.

Once it is established that the processor 50 and bus interface logic 62 are operational, the processor 50 may then begin executing further system diagnostic code from memory such as an EEPROM located somewhere on the system bus 38, for example on I/O module 36.

The next step in the power-up diagnostic sequence involves testing the primary CPU module 24 access to the other modules 14 in the system. Even if the CPU module 24 is not able to access one of the modules such as the I/O module 36 or a memory module 28 by way of the parallel system bus 38, it can check to see if the module is installed by way of serial control bus 46. As mentioned earlier, each module 14 includes a serial non-volatile memory 48 coupled to serial control bus 46. If the CPU module 24 is successfully able to write and read data from a serial non-volatile memory 48 on a given module 14, that module 14 is installed. Further testing is then required to determine the problem, and any fault information may be written to the non-volatile memory 48 on the faulty module.

It is important that there be a highly reliable connection of serial control bus 46 to each of the modules 14, as the serial control bus 46 is important during power-up to check for installation problems, and during diagnostics to write fault information into the non-volatile memories 48.

Thus, according to another aspect of the invention, apparatus is provided to enhance the reliability of the serial diagnostic bus 38. Accordingly, referring to FIG. 1, each circuit module 14 is mounted to the backplane 18 (not shown) through the backplane connectors 16. The serial diagnostic bus 38 runs across the backplane 18 and thus is connected to each module 14 through the backplane connectors 16.

Figure 4:
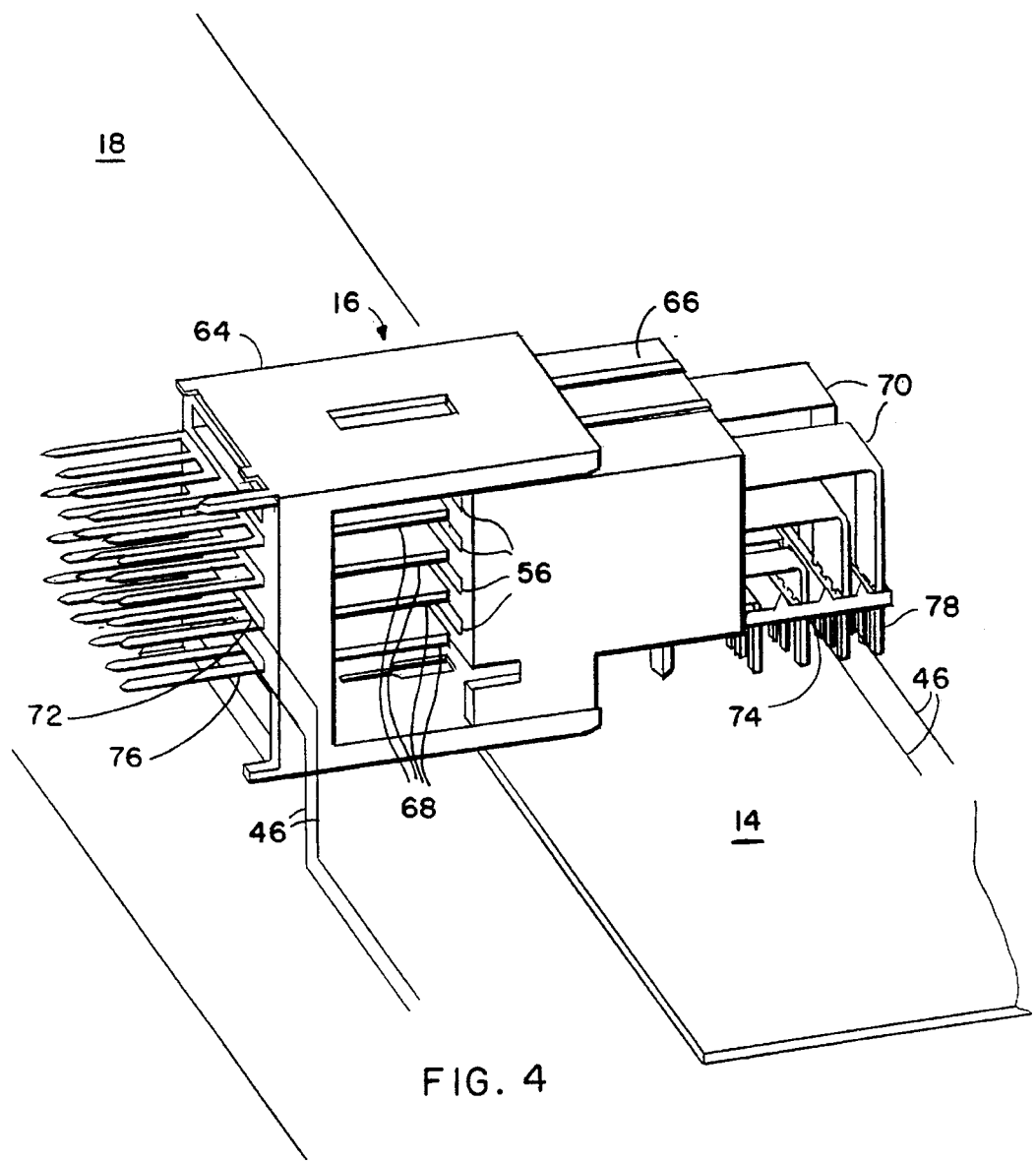
FIG. 4 shows the connector 16 electrically connected the module 14 to the backplane 18.

In a broad sense, referring to FIG. 4, the connector 16 electrically connects the module 14 to the backplane 18. The connector includes two parts 64 and 66, each part having corresponding signal conducting elements 68 and 70. The signal conducting elements 68 and 70 each have multiple solder connection points 72 and 74 to the backplane 18 and module 14 respectively. The serial control bus 46 is electrically connected to the backplane 18 and to the module 14 through the multiple solder connection points 72 and 74 of corresponding signal conducting elements 68 and 70 as shown.

More specifically, the backplane connector 16 includes two parts: a male part, 64, containing wide pins 68 having three solder connection leads 76 attached at solder connection points 72 to the backplane 18, and a female part 66, containing wide receptacles 70 for receiving the male pins and extending to three solder connection leads 78 attached at solder connection points 74 to the module. The serial control bus 46 is electrically connected to the corresponding backplane pins 68 and module receptacles 70 at the connection points 72 and 74. When the male and female parts 64 and 66 of backplane connector 16 are plugged together, the electrical connection of the serial control bus 46 between the backplane and the module is established, each signal of the serial control bus 46 being triply soldered to both the backplane and the module at the connection points 72 and 74. In the embodiment, the serial control bus is a two line bus, where each line is connected on the module 14 to the multiple solder connection points 72 of pins 68 of the male part 64 of the connector 16, and on the backplane 18 to the multiple solder connection points 74 of pins 70 of the female part 66 of the connector 16. Backplane connector 16 is conveniently implemented with DUPONT METRAL connectors.

As can be seen in the Figure, pins 68 and receptacles 70 provided a single wide electrical contact between the connector male and female parts 64 and 66 when the parts are plugged together. The width of the pins 68 lends a strength advantage which helps to prevent bending and adjacent pin shorts which are a common problem for high density connectors. If three separate pins were used rather than a single wide pin, then a given pin would be more likely to short to an adjacent signal, rendering the electrical serial bus connection inoperative. The width of the pins thus increases the reliability of the connection.

Also important during execution of power-up diagnostics is the ability to communicate to the user which modules are being tested, and whether or not they are operating properly. Ergonomic and regulatory design factors may specify that any LED provided to represent module functionality must be lit (on) only if the module is non-functional. Thus, according to another aspect of the invention, there is provided an apparatus and method for indicating module failures in a computer system.

Figure 5:
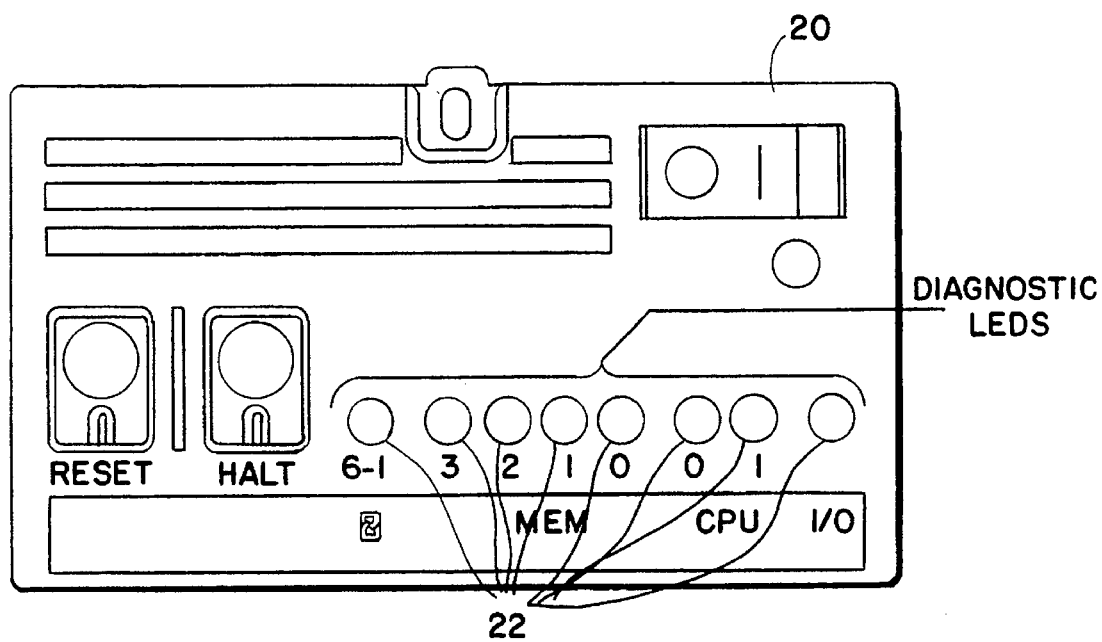
FIG. 5 shows the layout of the LED's on an operator control panel 20.

Broadly stated and referring to FIG. 2, The apparatus comprises one or more CPU modules 24 and 26, an I/O module 36, and one or more memory modules 28, 30, 32, and 34, all interconnected by the serial control bus 46. Further coupled to serial control bus 46 and shown in more detail in FIG. 5 is an operator control panel 20 comprising LED's 22 visible to the user. Each LED corresponds to a particular one of the modules 14, and is lit by the processor 50 of primary CPU module 24 by way of the serial control bus 46 to indicated a failure of the corresponding module.

According to this aspect of the invention, the LED's corresponding to each module are located on a control panel separate from the modules. Therefore, if a gross module failure prevents any access to the module, the LED corresponding to the module may still be lit to indicate the failure.

Figure 6:
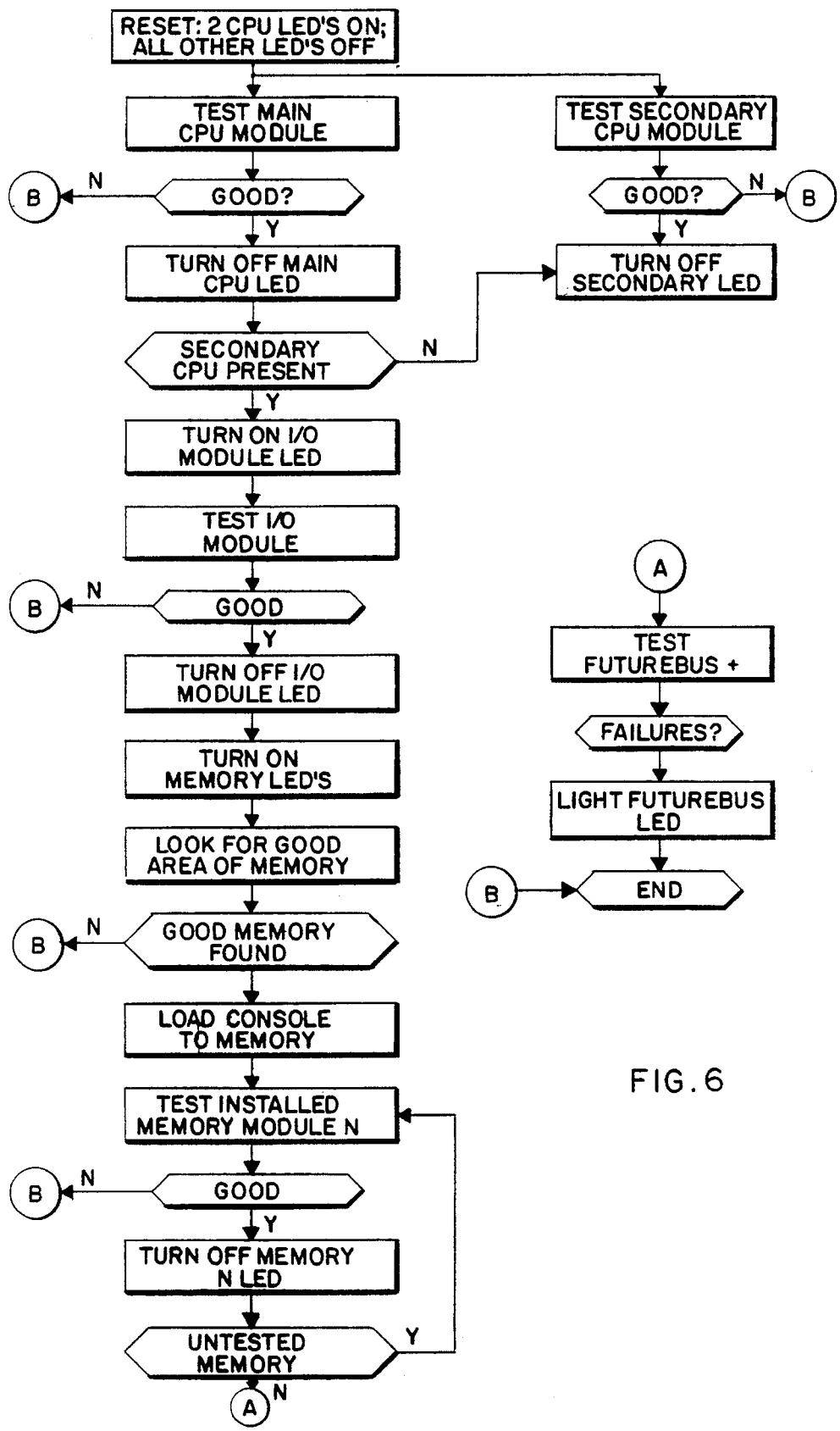
FIG. 6 is a flow-chart diagram showing a systematic method of indicating module failures using the LEDs 22 on the operator control panel 20.

A systematic method of indicating module failures using the LEDs 22 on the operator control panel 20 is also provided, and is diagrammed in the flow chart of FIG. 6. Upon power-up reset, the two LEDs 22 corresponding to the CPU modules 24 and 26 are turned on, while all other LEDs are turned off. Then, as described earlier, the processor 50 on primary CPU module 24 (always installed) begins executing the CPU module self-test, as does the secondary CPU module 26 if it is installed. If the testing of primary CPU module 24 detects no failures, the LED corresponding to primary CPU module 24 is turned off.

Primary CPU module 24 then tests for the presence of the secondary CPU module 26. If the secondary CPU module 26 is not installed, the primary CPU 24 turns off the LED corresponding to secondary CPU module 26, since the absence of a secondary CPU would not be considered a failure. In the event that the secondary CPU module 26 is installed, the LED corresponding to secondary CPU module 26 is left on, to be turned off by the secondary CPU module 26 only if it passes its self-test.

The primary CPU 24 then proceeds to check system bus access to the I/O module 36. The LED 22 corresponding to the I/O module 36 is turned on as the testing commences to indicate that the I/O module 36 is now being tested. If the CPU 24 cannot access the I/O module 36, the LED 22 corresponding to I/O module 36 remains lit, and testing is terminated. If the I/O module 36 is accessible via the system bus, the LED 22 corresponding to I/O module 36 is turned off.

Next, the primary CPU 24 tests the installed memory modules. All LEDs corresponding to installed memory modules 26, 28, 30, and 32 are turned on. Then each memory module is tested in succession, and its corresponding LED turned off in the event that the testing detects no failures.

In particular, after system bus access to the I/O module 36 is verified, the primary CPU 24 attempts to find an operational area of memory in which to store console code stored in a ROM on the I/O module 36. One to four memory modules may be installed. The LEDs for uninstalled memory modules remain off, since uninstalled memory does not indicate an error. The primary CPU 24 turns on the LEDs 22 corresponding to each of the installed memory modules, for example memory modules 26, 28, and 30, and 32. It then checks an area of memory large enough to hold the console code. For example, the primary CPU 24 may first check memory module 26 for an operational area of memory. If no good memory is found, the LED 22 corresponding to memory module 26 remains lit, and the primary CPU 24 proceeds to another installed memory module, for example memory module 28. The process continues until good memory is found on one of the memory modules 26, 28, 30, or 32. If no good memory is found, all the LEDs for the installed memory modules remain lit, and testing is terminated.

If an operational area of memory is found, the console code is transferred over the system bus 38 from the I/O module 36 to the operational area of memory. The primary CPU 24 then executes the console code, which contains more detailed diagnostics, including memory diagnostics. Primary CPU 24 executes diagnostic tests for each installed memory module 26, 28, 30, and 32. The LED corresponding to memory modules which pass the diagnostic tests are turned off, while the LEDs 22 corresponding to memory modules which failed testing remain lit.

The operator control panel 20 also includes an LED 22 indicating the power-up status of installed I/O bus 42 devices; particularly, of Futurebus+ modules. If any of the installed Futurebus+ modules fails its own power-up self test, the LED 22 corresponding to the Futurebus+ 42 is lit.

Once power-up diagnostics are complete and the system has entered a normal operating mode, it may be desirable to monitor problems which might occur in critical parts of computer system 10, such as the power system control module. Therefore, according to another aspect of the invention, there is provided apparatus for providing a power system status history.

Accordingly, status indicators corresponding to various environmental conditions are supplied, and are stored in a non-volatile memory whenever a status indicator changes value. Thus, in the event of a system shutdown, a non-volatile memory retains a status history representing the changes in environmental conditions associated with the system prior to shutdown.

Figure 7:
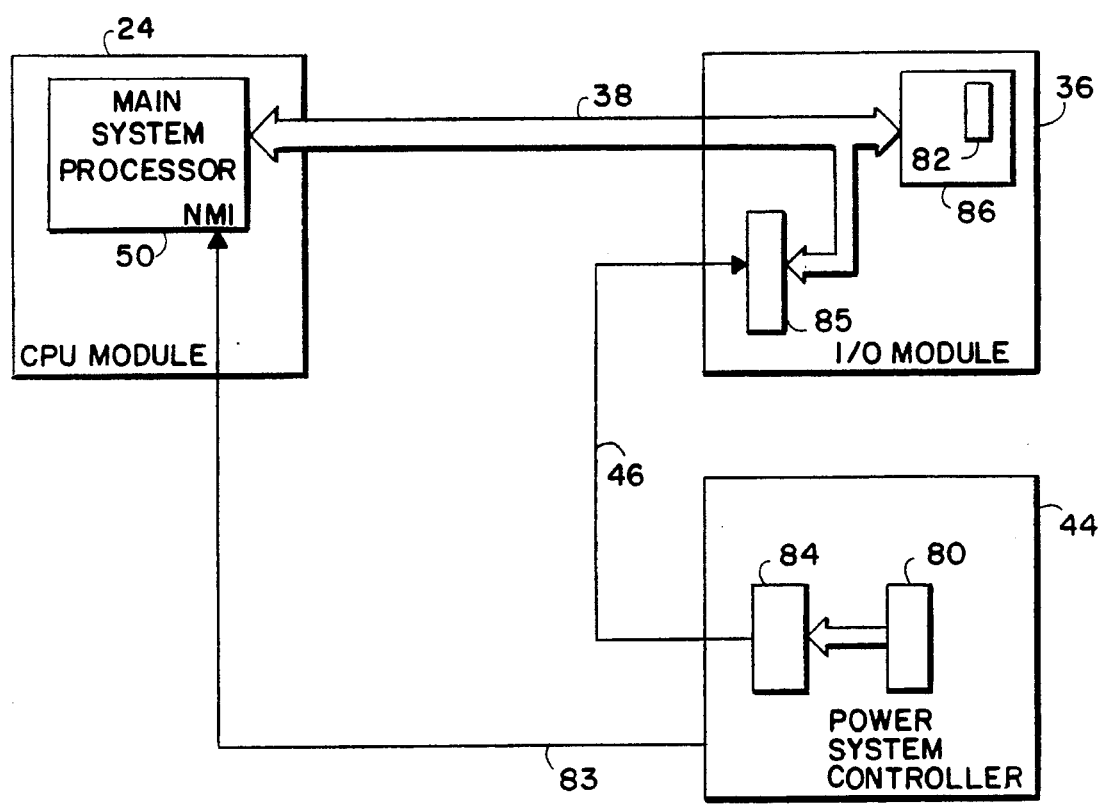
FIG. 7 is functional block diagram showing the apparatus providing a power system status history.

Referring to FIG. 7, the apparatus for providing a power system status history is shown including a more detailed functional block diagram of the power system control module 44, the I/O module 36, and the CPU module 24. All three modules 44, 36, and 24 are interconnected by the serial control bus 46. The CPU module 24 and the I/O module 36 are also connected by the parallel system bus 38.

The apparatus includes means 80 for generating status indicators corresponding to various environmental conditions associated with the computer system 10, a non-volatile memory 82, and means for storing the status indicators in the non-volatile memory 82 whenever an indicator changes value.

Accordingly, the power system control module 44 further includes means 80 for generating status indicators. These indicators are binary bits, each representing conditions such as an AC line failure, a DC line failure, an over temperature failure, a fan failure, or a converted DC failure. Bits may also indicate a battery on condition, or an over temperature warning.

As indicated, it may be desirable to provide status indicators for other environmental conditions. For example, in a system in which multiple fan speeds are selectable, a status indicator for fan speed might be provided. It is also possible to provide indicating bits for representing any environmental condition which would be relevant in determining the cause of a system shutdown. It is also conceivable to provide series of bits as status indicators representing a range of values for a given condition.

Means for generating the status indicators can be provided in any number of conventional ways. For example, temperature warning and over temperature bits may be set in response to the changing voltage across a thermistor. Bits representing AC or DC line failures, converted DC failures, fan failures, and battery on conditions may be set in response to voltage or current sensitive active switches associated with these circuits. In the embodiment shown in the Figure, the status indicators are generated as a series of parallel bits. (See FIG. 7.)

When a change in environmental conditions causes a status bit to change value, a high level non-maskable hardware interrupt is asserted over an interrupt line 83 by the power system control module 44 to the processor 50 on the CPU module 24. The ensuing interrupt routine causes the storing of the status indicators 80 in the non-volatile memory 82. Every successive change in the monitored environmental conditions which is substantial enough to cause a status indicator to change value will trigger the interrupt event. As a result, a running history of the changes in the system environmental conditions is maintained in the non-volatile memory 82. In the event of a system shutdown, this history is retained for observation on powerup, thus aiding in determining the cause of the shutdown.

Accordingly, means for storing the status indicators in the non-volatile memory 82 are provided. Power system control module 44 further includes means for converting the parallel status indicators 80 to a serial bitstream suitable for serial transfer over the serial control bus 46. A parallel to serial convertor 84 is provided on the power system control module 44 for this purpose.

As shown in FIG. 7, where the serial control bus 46 is implemented as an $I^2C$ bus, the parallel to serial convertor 84 is conveniently implemented as a PCD8584 8 bit parallel to $I^2C$ convertor.

A serial line controller 85 on the I/O module 36 controls transfers on the serial control bus 46 during normal system operation. According to instructions received during the interrupt routine for storing the status indicators, the serial line controller 85 transfers the serial bitstream output of the parallel to serial convertor 84 across the serial control bus 46 to its own internal register, and interrupts the processor 50 then reads the contents of the internal register of serial line controller 85 over parallel system bus 38, and then writes the parallel status information to the non-volatile memory 82 on the I/O module 36 by way of the parallel system bus 38.

In the embodiment shown in the Figure, a time of year clock 86 resides on I/O module 36 for a variety of purposes useful to the operation of computer system 10. Within time-of-year clock 86 there is included a CMOS RAM with battery back-up capability. This CMOS RAM is utilized as the non-volatile memory 82 for storing the status indicators. Therefore, when writing the status information, the processor 50 transfers the parallel bitstream over the parallel system bus 38 and writes it to the CMOS RAM 82 internal to the time-of-year clock 86.

The method and apparatus for providing a power system status history has been described for operation in the preferred embodiment of the invention. However, it is possible to implement the power system status history of the invention in any electronic system. No serial control bus need be present; means for storing the status indicators in a non-volatile memory may be implemented simply, for example, as a parallel bus connecting the parallel status indicators to the non-volatile memory, with a control device for initiating and completing the actual transfer.

I claim:

1. A computer system comprising:

an I/O module installed in the computer system;

one or more memory modules installed in the computer system;

a CPU module installed in the computer system and performing diagnostic testing on each of the I/O module, the one or more memory modules, and the CPU module, the diagnostic testing for each module producing diagnostic results indicating either that the module has passed diagnostic testing and is fully functional when installed in the computer system or that the module has failed diagnostic testing and is not fully functional when installed in the computer system;

a console panel comprising LED's visible to a user, each LED electrically coupled to the CPU module and corresponding to one of the CPU module, the I/O module, and the memory modules, such that for each LED, the LED is unlit when the diagnostic results for the corresponding module indicate that the module has passed diagnostic testing, and the LED is lit when the diagnostic results for the corresponding module indicate that the module has failed diagnostic testing.

2. A method of displaying module diagnostic results in a computer system comprising:

providing a computer system having installed therein one or two CPU modules, an I/O module, and a plurality of memory modules;

providing a console panel comprising LED's, an LED corresponding to each of said modules for indicating module diagnostic results;

executing diagnostic instructions on one CPU module comprising:

turning on the LEDs corresponding to the CPU modules and turning off the LEDs corresponding to all other modules in response to a hardware reset;

testing the one CPU module, and testing the 2nd CPU module if the 2nd CPU module is installed;

turning off the LED corresponding to the one CPU module if the testing of the one CPU module detects no failures, or terminating testing if a failure is detected;

testing for the presence of the 2nd CPU module if no failures were detected during the testing of the one CPU module;

turning off the LED corresponding to the 2nd CPU module if the 2nd CPU module is found to be not present;

turning on the LED corresponding to the I/O module;

testing for bus access to the I/O module from the 1st CPU module;

turning off the LED corresponding to the I/O module if the testing for bus access detects no failures, or terminating testing if a failure is detected;

turning on the LEDs corresponding to all memory modules that are installed if the testing for bus access to the I/O module detected no failures; and For each memory module that is installed, testing the memory module;

turning off the LED if the testing of the memory module detects no failures.

3. A method of displaying module diagnostic results in a computer system comprising:

providing a computer system comprising one or two CPU modules, an I/O module, and a plurality of memory modules;

providing a console panel comprising LED's, an LED corresponding to each of said modules;

executing diagnostic instructions on one CPU module comprising:

turning on the LEDs corresponding to the CPU modules and turning off the LEDs corresponding to all other modules in response to a hardware reset;

testing the one CPU module, and testing a 2nd CPU module if the 2nd CPU module is installed;

turning off the LED corresponding to the one CPU module if the testing of the one CPU module detects no failures, or terminating testing if a failure is detected;

testing for the presence of the 2nd CPU module if no failures were detected during the testing of the one CPU module;

turning off the LED corresponding to the 2nd CPU module if the 2nd CPU module is found to be not present;

turning on the LED corresponding to the I/O module;

testing for bus access to the I/O module from the 1st CPU module;

turning off the LED corresponding to the I/O module if the testing for bus access detects no failures, or terminating testing if a failure is detected;

turning on the LEDs corresponding to all memory modules that are installed if the testing for bus access to the I/O module detected no failures;

testing for an operational area of memory on any one of the memory modules;

terminating testing if no operational area of memory is found;

if an operational area of memory was found, loading console code from the I/O module into the operational area of memory, testing each memory module, and turning off the LED corresponding to each memory module if the testing detects no failures.

* * * * *